(12) United States Patent
Oz et al.

(10) Patent No.: US 7,817,672 B2
(45) Date of Patent: *Oct. 19, 2010

(54) METHOD AND DEVICE FOR PROVIDING PROGRAMS TO MULTIPLE END USER DEVICES

(75) Inventors: Ran Oz, Modi'in (IL); Shai Benjamin, Mevaseret Zion (IL); Gilat Avieli, Jerusalem (IL); Nery Strasman, Ramat-Gan (IL); Amir Leventer, Kfar Saba (IL); Mordechai Finkelstein, Tel Aviv (IL); Asi Elad, Neve Monoson (IL); John Reister, Palo Alto, CA (US)

(73) Assignee: BigBand Networks Inc., Redwood City, CA (US)

( * ) Notice: Subject to any disclaimer, the term of this patent is extended or adjusted under 35 U.S.C. 154(b) by 529 days.

This patent is subject to a terminal disclaimer.

(21) Appl. No.: 11/617,637

(22) Filed: Dec. 28, 2006

(65) Prior Publication Data

US 2007/0177632 A1 Aug. 2, 2007

Related U.S. Application Data

(60) Provisional application No. 60/764,736, filed on Feb. 1, 2006, provisional application No. 60/764,852, filed on Feb. 3, 2006, provisional application No. 60/777,801, filed on Feb. 28, 2006.

(51) Int. Cl.
 *H04H 20/28* (2008.01)
(52) U.S. Cl. ....................................... 370/486
(58) Field of Classification Search ................. None
 See application file for complete search history.

(56) References Cited

U.S. PATENT DOCUMENTS

| 6,615,039 | B1 * | 9/2003 | Eldering ................ 455/418 |
| 7,430,222 | B2 * | 9/2008 | Green et al. ............ 370/486 |
| 2003/0018966 | A1 * | 1/2003 | Cook et al. ............. 725/2 |
| 2003/0149975 | A1 * | 8/2003 | Eldering et al. .......... 725/34 |

\* cited by examiner

*Primary Examiner*—Frank Duong
(74) *Attorney, Agent, or Firm*—Reches Patents (57) ABSTRACT

A device and a method for providing programs to multiple end user devices. The method includes: providing to multiple end user devices, via an edge device, at least one type of media stream out of unicast media stream and a multicast media stream; wherein the at least one type of media stream convey a group of programs; receiving a request from a first end user device to view a first program that belongs to the group of programs; and selectively switching, in response to bandwidth constraints imposed on a communication path coupled to the edge device, a type of a media stream that conveys the first program to a second end user device.

24 Claims, 9 Drawing Sheets

METHOD AND DEVICE FOR PROVIDING PROGRAMS TO MULTIPLE END USER DEVICES

RELATED APPLICATIONS

This application is a non-provisional of, claims priority to and incorporates by reference the following U.S. Provisional Patent Applications: 60/764,736, filed 1 Feb. 2006; 60/764,852, filed 3 Feb. 2006; and 60/777,801, filed 28 Feb. 2006.

FIELD OF THE INVENTION

The present invention relates to communication systems and especially to methods and systems for providing programs to multiple end user devices

BACKGROUND

The number of television channels (programs) has dramatically increased during the last decade thus increasing bandwidth requirements between operators and users. In addition, various technologies such as high definition television require larger bandwidth.

In order to provide many programs to multiple user devices various techniques such as statistical multiplexing and various compression schemes (such as but not limited to the MPEG compression standards) were developed. These techniques can improve the bandwidth utilization of existing infrastructure. Nevertheless, even when these techniques are implemented the number of programs that can be provided to users is limited.

The following patents and patent applications, all being incorporated herein by reference, illustrate some prior art methods and devices for providing multiple programs to users: U.S. Pat. No. 6,597,670 of Tweedy et al., titled "Method and system for distributing subscriber services using wireless bidirectional broadband loops"; U.S. patent application publication serial number 2005/0033342 of Rosetti et al., titled "Technique for providing a virtual digital video recorder service through a communication network"; U.S. patent application serial number 2005/0120377 of Carlucci et al., titled "Technique for effectively providing various entertainment services thorough a communication network"; PCT patent application WO2005/008419 of Compton et al., titled "Distributed and scalable architecture for on demand session and resource management"; PCT patent application publication number WO2005/022796 of Krause et al., titled "Advanced, adaptive video multiplexing system"; PCT patent application publication number WO2005/022892 of Krause et al., titled "Video multiplexer system providing low-latency VCR-like effects and program changes" and U.S. Pat. No. 6,718,552 of Goode "network bandwidth optimization by dynamic channel allocation".

There is a need to provide efficient methods and devices for providing programs to multiple users.

SUMMARY OF THE INVENTION

A device for providing multiple programs. The device includes an output interface adapted to: (i) provide to an edge device at least one type of media stream out of unicast media stream and a multicast media stream; wherein the at least one type of media stream convey a group of programs; wherein the media streams are provided via the edge device to multiple end users; (ii) receive a request from a first end user device to view a first program that belongs to the group of programs; and a controller adapted to determine when to selectively switch, in response to bandwidth constraints imposed on a communication path coupled to the edge device, a type of a media stream that conveys the first program to a second end user device.

A method for providing programs to multiple end user devices. The method includes: providing to multiple end user devices, via an edge device, at least one type of media stream out of unicast media stream and a multicast media stream; wherein the at least one type of media stream convey a group of programs; receiving a request from a first end user device to view a first program that belongs to the group of programs; and selectively switching, in response to bandwidth constraints imposed on a communication path coupled to the edge device, a type of a media stream that conveys the first program to a second end user device.

BRIEF DESCRIPTION OF THE DRAWINGS

The present invention will be understood and appreciated more fully from the following detailed description taken in conjunction with the drawings in which.

DETAILED DESCRIPTION

It is noted that the description relates to MPEG (and especially MPEG2) compliant programs and components, but the invention is applicable to other types of media unit decoding and/or compression schemes as well.

The method and device facilitate an alteration of a type of a media stream that is provided to an end user device in response to requests generated by another end user device. If bandwidth constraints require a reduction of the aggregate bandwidth of media streams provided to an edge device then at least one media stream can be converted from a unicast media stream to a multicast media stream. If bandwidth constraints allow an increment of the aggregate bandwidth of media streams provided to an edge device then at least one media stream can be converted from a multicast media stream to a unicast media stream.

Conveniently the alteration of program (also referred to as channel) type from multicast to unicast occurs at switching points such as advertisement splicing points or channel change requests, thus providing a substantially seamless media stream type alteration. Switching in these switching points can be performed so that they are unnoticed by the end user.

Figure 1:
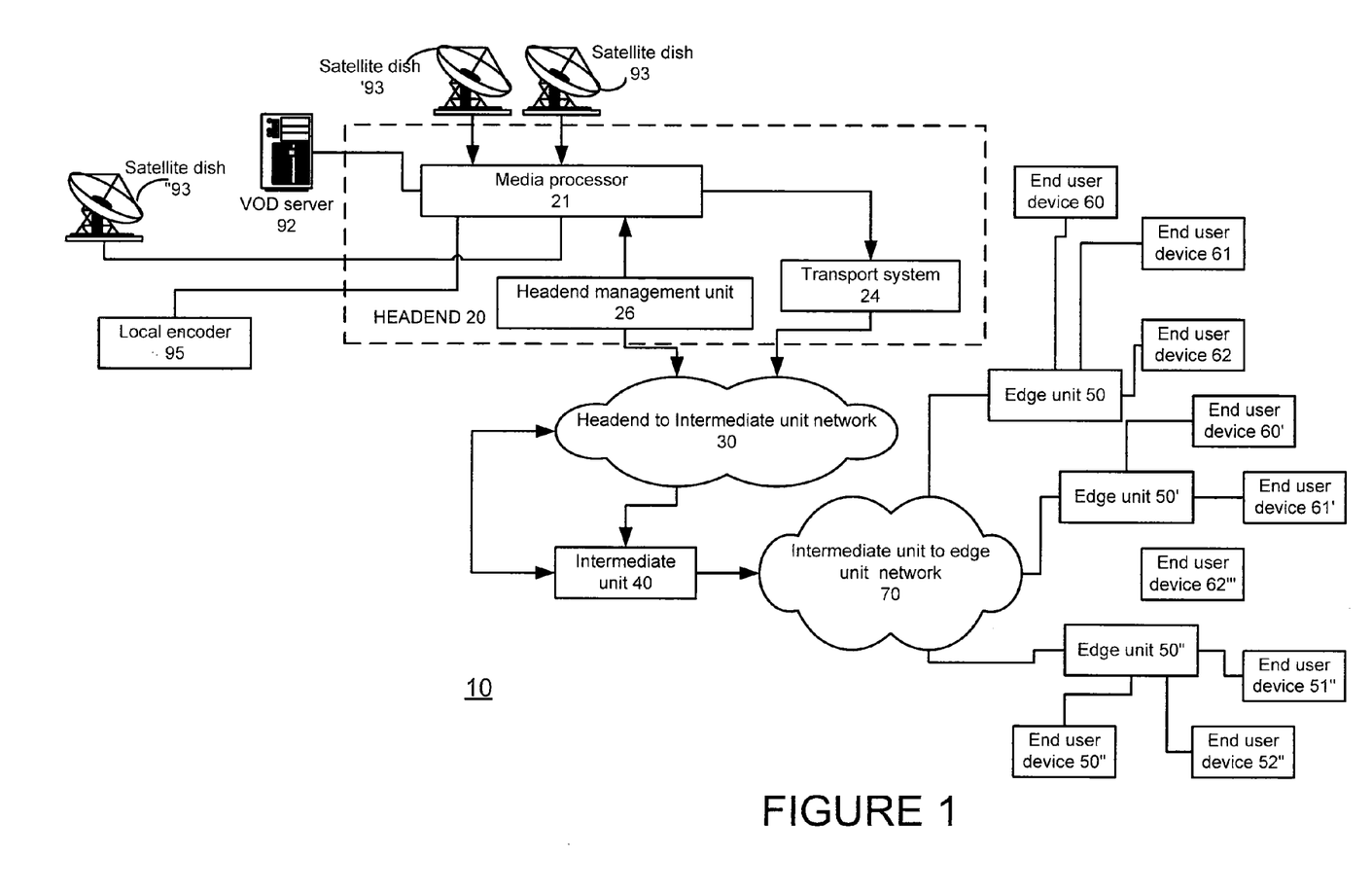
FIG. 1 illustrates an intermediate unit and its environment according to an embodiment of the invention.

FIG. 1 illustrates an intermediate unit 40 and its environment 10 according to an embodiment of the invention.

Intermediate unit 40 can also be referred to as aggregate unit or as device. According to an embodiment of the invention intermediate unit 40 receives multicast media streams as well as unicast media streams and is able to alter the type (multicast, unicast) of media streams that it provides to one or more edge units (such as edge units 50, 50' and 50") in response to various parameters including bandwidth limitations of the communication paths between intermediate unit 40 and edge units 50, 50' and 50" accordingly. According to another embodiment of the invention intermediate unit 40 can receive only one type of a media stream and generate the other type of media stream.

Intermediate unit 40 can also receive upstream transmission from end user devices 60-62, 60'-62' and 60"-62" and send it towards headend 20. It is noted that multiple end user devices can be placed in a single household.

Intermediate unit 40 is also able to process media streams by applying various rate-shaping and/or compression algorithms.

Intermediate unit 40 can change the type of media streams provided to certain end user devices in response to requests from other end user devices. Thus, a change between multicast stream to unicast stream (and vice verse) provided to a certain end user device can occur even if that certain end user device does not request to change the program it receives.

Headend 20 and intermediate unit 40 are connected to each other via a headend to intermediate unit network 30. The intermediate unit 40 is connected to multiple edge units such as edge units 50-50" via intermediate unit to edge unit network 70. It is noted that the number of edge units that are connected to a single intermediate unit can exceed and even well exceed three. Typically, each edge unit is connected to the intermediate unit 40 via a bandwidth limited communication link. This bandwidth limited communication link may cause the intermediate unit 40 to alter the type of media streams it sends to the edge unit and also may cause the intermediate unit to compress one or more media streams.

Conveniently, the edge unit is a DSLAM, but this is not necessarily so.

Environment 10 can be used to convey data, voice and video to end user devices and also receive upstream traffic from the end user devices towards headend 20. It is noted that headend 20 can have a distributed architecture, and that various components such as but not limited to video on demand servers, broadband network gateways and the like can be connected to the intermediate unit 40. In addition, more than two networks can be connected to the intermediate unit 40.

Headend 20 can receive media content from various sources such as video on demand server 92, local encoder 95, and satellite dishes 93, 93' and 93". Headend 20 includes a media processor 21 that can process programs in various manners, including rate-shaping, perform PID re-mapping, generate delayed versions of a program, duplicate programs, perform statistical multiplexing, compress, encrypt and the like. It is noted that video on demand server 92 can also be connected to intermediate unit 40 and not the headend 20.

An exemplary broadband media router that has such media processing capabilities is described in U.S. Pat. No. 6,434, 141 of Oz et al., which is incorporated herein by reference. An exemplary method and device for generating delayed version of programs is described in U.S. Pat. No. 6,813,270 of Oz et al., which is also incorporated herein by reference. It is further noted that intermediate unit 40 can have at least some of the video processing capabilities of the broadband media router, although it is not necessarily a router but can be only a switch.

Headend 20 transmits a headend multiplex (M0) to multiple intermediate units, such as intermediate unit 40. Each intermediate unit transmits an intermediate unit multiplex (for example multiplexes M1-M3 of intermediate unit 40) to multiple edge devices such as edge devices 50-50". Typically, end user devices that receive the same multiplex are referred to as an end user devices group.

Media processor 21 of headend 20 is controlled by headend management unit 26 that may determine which media processing operations to apply and also determine which media streams should be included within the headend and intermediate unit multiplexes. These media streams can include multicast and unicast media streams. Typically, programs received from satellite dished 93-93" are conveyed over multicast media streams while programs received from VOD server 92 are conveyed over unicast media streams, but this is not necessarily so.

Intermediate unit 40 can receive a program that is being conveyed over a multicast media stream and convert the multicast media stream to one or more multicast media streams. This split can be made for various reasons, including targeted advertising (also referred to as addressable advertising).

Usually, headend 20 is connected to multiple intermediate units (for example intermediate units 40 and 40' FIG. 3), and is capable of providing to each intermediate unit a different program multiplex. It is noted that the number of intermediate units can differ from two.

Alternatively, each intermediate unit can receive a headend multiplex of programs and select the programs and the type of conveying media streams to be included within the intermediate unit multiplex of programs. Typically, the bandwidth of the headend to intermediate unit network 30 is much larger than the bandwidth of the intermediate unit to edge unit network 70, thus the headend multiplex can include much more programs than the intermediate unit multiplex. The intermediate unit to edge unit network 70 can include multiple point to point links from IU 40 to multiple edge units.

The headend management unit 26 can perform additional tasks such as billing related tasks, and the like.

Headend 20 also includes a transport system 24 that is adapted to receive one or more program multiplexes from media processor 21 and to process it such as to comply with format conveyed over headend to intermediate unit network 30. This processing may include fragmentation, aggregation, packet encapsulation, and the like.

Headend management unit 26 is usually adapted to perform resource allocation. The resource allocation determines the resources (including component, frequency, bandwidth, port and the like) that are allocated for a certain task (such as a transmission of a program). Headend management unit 26 can determine which programs to include within each multiplex, when to send program removal information and how to respond to received program removal responses that are transmitted by user devices.

According to another embodiment of the invention the resource management is performed, at least partially, by management units located within one or more intermediate units.

According to an embodiment of the invention headend 20 can determine which programs to include within each program multiplex based upon various parameters, including user viewing patterns, viewing statistics and the like.

Figure 3:
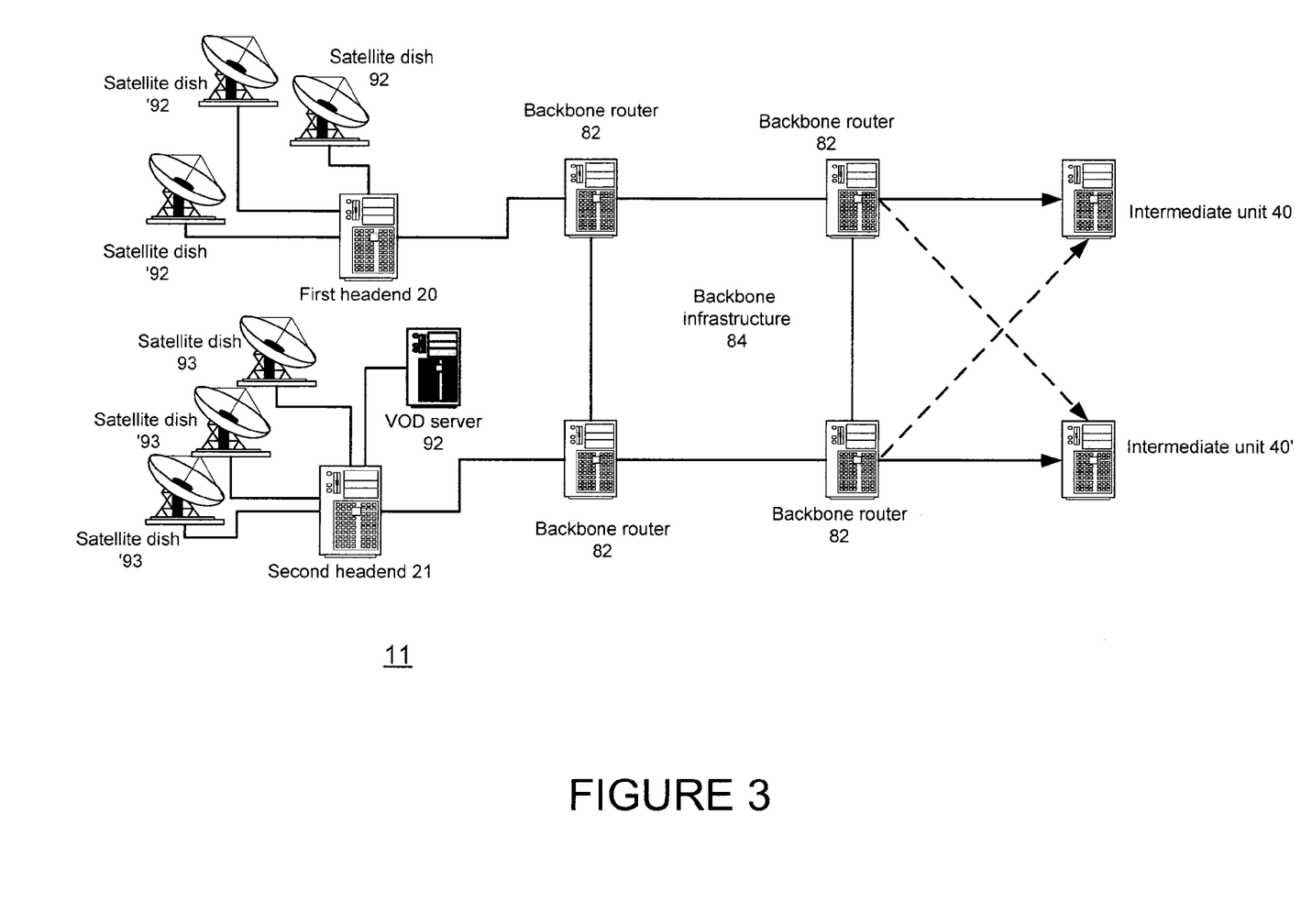
FIG. 3 illustrates intermediate units and their environment according to an embodiment of the invention.

According to an embodiment of the invention the headend 20, or any of the intermediate units 40 and 40' are capable of inserting advertisements in the various multiplexes. By knowing which program will be viewed by which end user, the headend 20 or any intermediate unit can send to that end user addressable advertisements. An addressable advertisement is an advertisement that has a certain degree of correlation with the program viewed by the end user, or with one other end user characteristic. An end user characteristic can be learnt from the end user viewing patterns, and especially from the programs the end user watches. The headend and/or intermediate units 40 or 40' can receive end user related information from the end users or from other data sources or databases.

According to an embodiment of the invention the end user can also receive interactive services, thus the manner in which the end user participates in these services can also indicate which commercials to send to the end user.

Each component out of the headend 20, intermediate unit 40 or intermediate unit 40' can insert a unique advertisement to a program that is sent to one or more end user devices.

According to an embodiment of the invention a component allocates a certain channel to a client. When the client wishes to switch programs the central component switches the programs that are sent over the certain channel. In such a case the advertisement is inserted to the new program. The type of media stream (multicast or unicast) can be dynamically altered in response to load imposed on the edge device.

According to an embodiment of the invention an advertisement inserting component such as headend 20, intermediate unit 40 and optionally even an edge device 50 includes multiple transmitters and the allocation of programs between transmitters can depend upon the popularity of transmitted programs, the expected viewing patterns and the like. Such a component can insert an advertisement into the program that is sent to one or more end user devices by applying well known advertisement insertion (splicing) techniques.

Conveniently, an advertisement insertion can include: (i) Determining one or more programs that are sent to one or more end user devices. (ii) Determining one or more advertisement to insert into the one or more programs, and (iii) Sending one or more programs that include one or more advertisements to the one or more end user device. Conveniently, an end user device can receive an advertisement that is associated with one or more characteristics of the end user. Conveniently, the characteristics are provided from a source that is external to the distribution network, but this is not necessarily so. Conveniently, the characteristic reflects the program viewed by the client or viewing patterns of the client.

It is further noted that the content of a certain multiplex can be responsive to current viewing statistics, to previous viewing patterns, to expected viewing patterns, and/or to predefined criterion. Such a criterion can be responsive to a transmission priority of a program.

Figure 2:
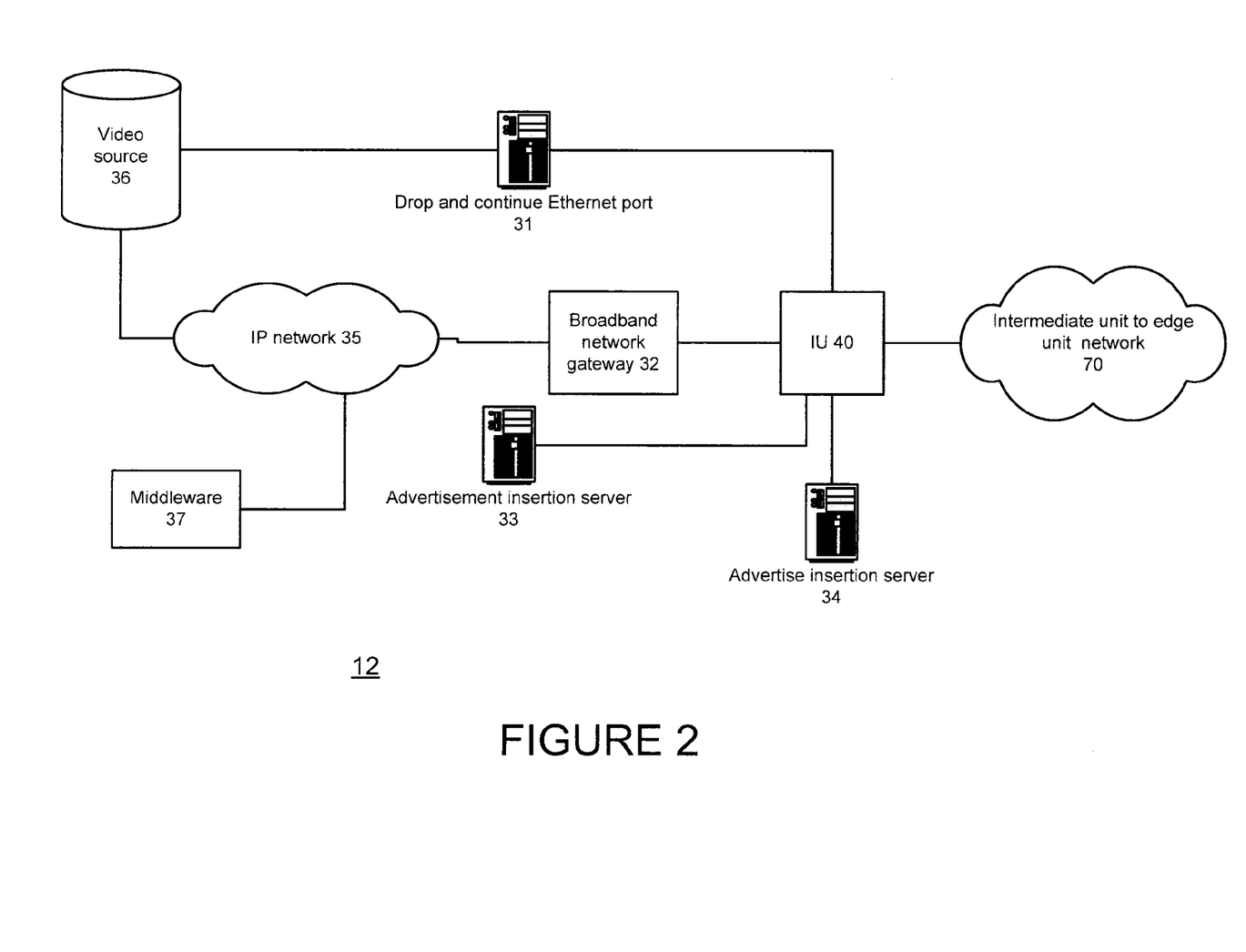
FIG. 2 illustrates an intermediate unit and its environment according to an embodiment of the invention.

FIG. 2 illustrates intermediate unit (IU) 40 and its environment 12 according to an embodiment of the invention.

Intermediate unit 40 can be connected to a video source 36 via a drop and continue Ethernet port 31 and via an Internet Protocol network 35 that is followed by a broadband gateway. Intermediate unit 40 can receive video content via one of the mentioned above paths or from both. It is noted that the Internet Protocol (IP) and the Ethernet port are provided only as examples of certain communication protocols and network and that other communication protocols and networks can be connected to intermediate unit 40 without departing from the scope of the invention.

Intermediate unit 40 also communicates with middleware 37, via IP network 35 and broadband network gateway. It can exchange with middleware 37 control signals and status signals and can receive, for example the multicast and unicast addresses to be used when providing media streams to the edge devices. Middleware 37 can also provide program related information such as an Interactive Program Guide.

Intermediate unit 40 is also connected to an advertisement streaming server 34. It can receive advertisements and insert them in predefined locations that are usually identified by splice insertion tones or signals.

FIG. 3 illustrates intermediate units 40 and 40' and their environment 1 according to an embodiment of the invention.

A first intermediate unit 40 and a second intermediate unit 40' are connected to headends 20 and 20' via backbone infrastructure 84 that can include headend to intermediate unit network 30. This connection can increase the redundancy of the environment (for example by sending the same content to both intermediate units) but this is not necessarily so.

Backbone infrastructure 84 is illustrated as including four backbone routers 82 that are connected to each other. It is noted that backbone infrastructure 84 can have other prior art configurations.

Figure 4:
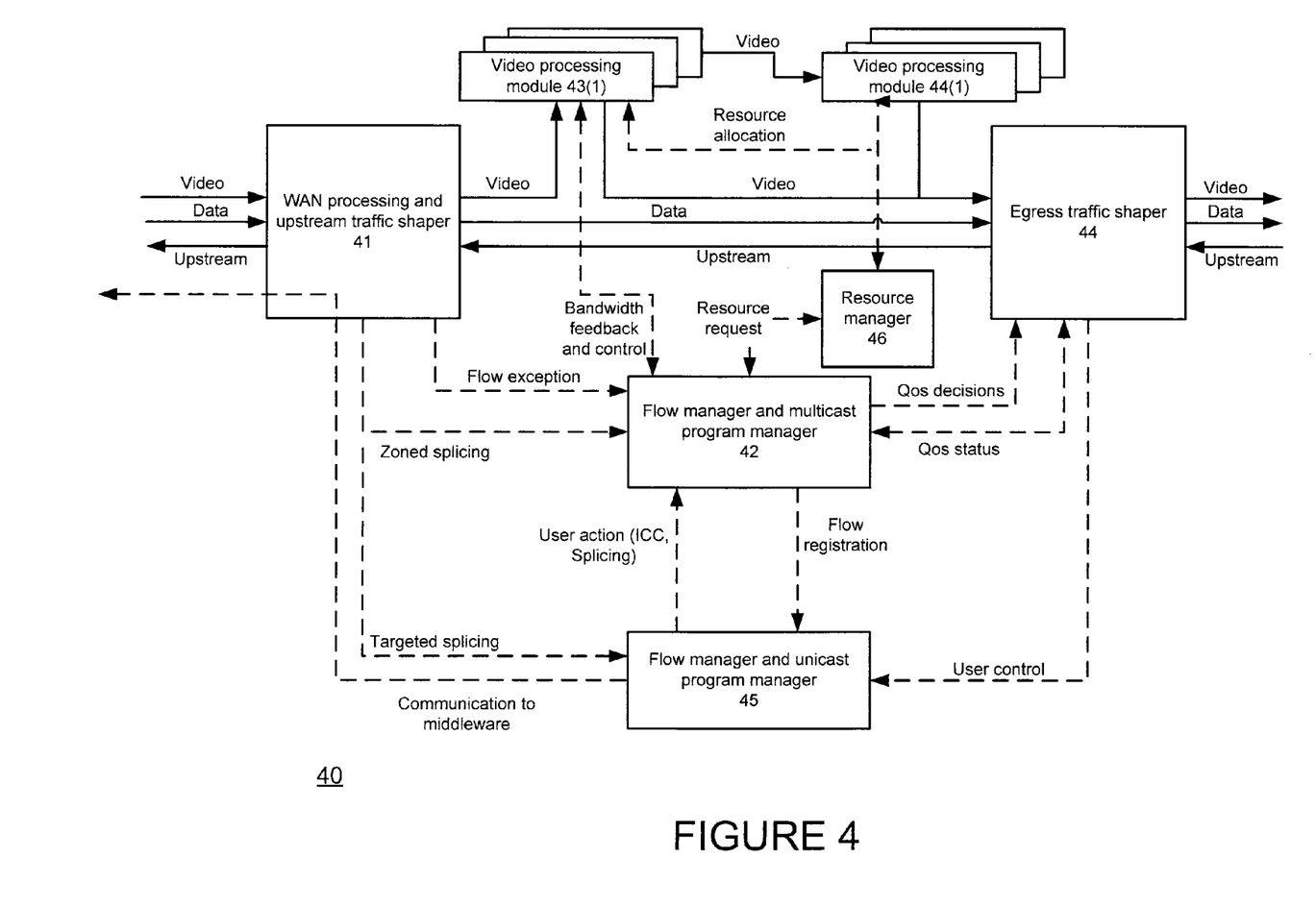
FIG. 4 illustrates an intermediate unit according to an embodiment of the invention.

FIG. 4 illustrates intermediate unit 40 according to an embodiment of the invention.

Intermediate unit 40 may send data and video via edge devices towards end user devices and can receive upstream traffic from the end user devices (via edge device). Typically the downstream traffic (towards the end user devices) is transmitted via downstream communication paths while the traffic from the end-user devices is transmitted via upstream communication paths.

Intermediate unit 40 includes an output interface, a controller and an input interface. The controller can include egress traffic shaper 44, the controller can include resource manager 46, flow manager and multicast program manager 42 and flow manager and unicast program manager 45. Intermediate unit also includes one or more video processors such as video processing modules 43(1)-43(K) and 44(1)-44(K). Intermediate controller 40 is connected to headend to intermediate unit network 30 via WAN processing and upstream traffic shaper 41.

Figure 5:
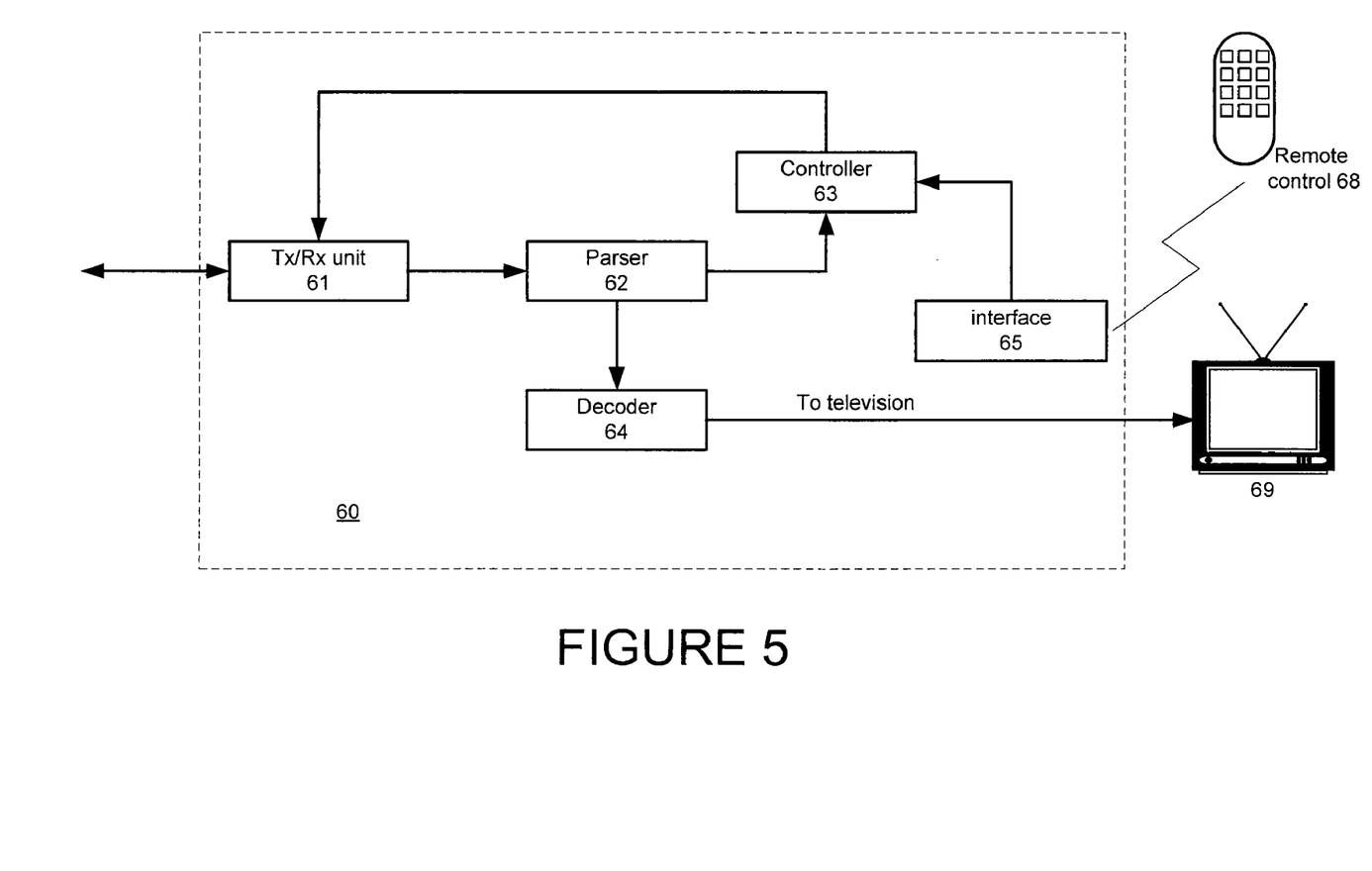
FIG. 5 illustrates a user device according to an embodiment of the invention.

FIG. 5 illustrates a user device 60, according to an embodiment of the invention.

Device 60 can be a set top box or another computerized entity. It is connected to a display, such as television 69 and can receive instructions from a remote control, via interface 68. Thus, instructions such as change program instructions, alter picture or sound related instructions, as well as signals exchanged during interactive sessions are received by interface 65 and sent to controller 63. It is noted that instructions can be provided in various manners including, but not limited to, using user device buttons, using a keyboard, using a mouse and the like.

The analysis of these signals can indicate if a user views the received programs. The analysis can be responsive to the length of viewed programs, and/or to viewing patterns of the viewers. The interface 65 can also receive signals sent to the television, thus provide additional indication about the viewing related activities of the user.

User device 60 also includes a transceiver unit (denoted RX/TX unit) 61 that is adapted to receive and transmit signals, such as radio frequency signals, over edge unit to user device network which usually includes (when DSL technologies are applied) a twisted pair of wires per end user device (or per a group of end user devices residing in the same residence).

The transceiver unit 61 is connected to parser 62 that can selectively provide data and control signals to controller 63 while sending programs to decoder 64. Decoder 64 is connected to television 69.

Figure 6:
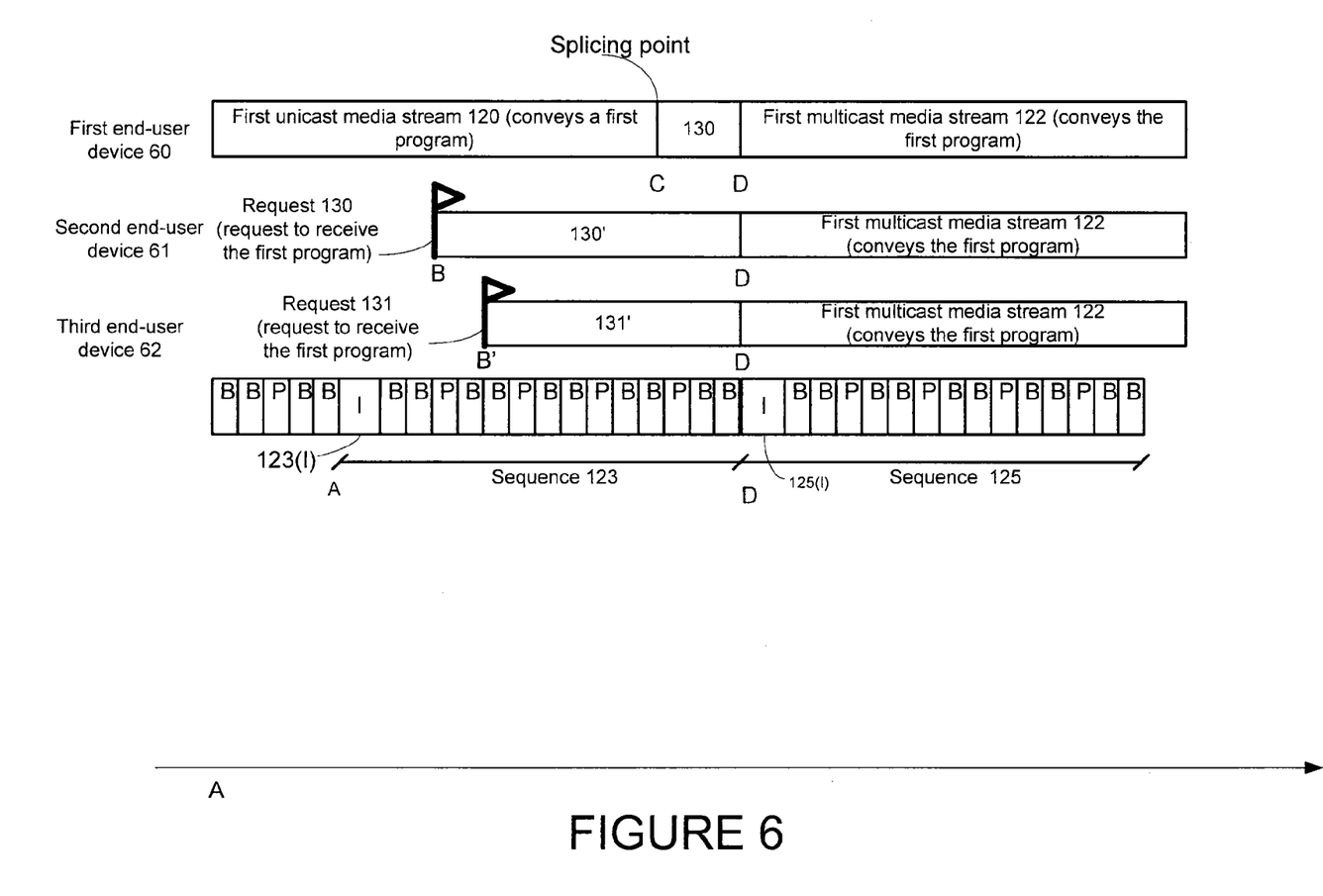
FIG. 6 illustrates various media streams that are provided to end user devices according to an embodiment of the invention.

FIG. 6 illustrates various media streams that are provided to end user devices according to an embodiment of the invention.

At a starting point first end user device 60 receives a first unicast media stream 120. First unicast media stream conveys a first program.

A first multicast media stream 122 can be provided to another end user. It includes multiple sequences of pictures such as sequence 123 and sequence 125. Sequence 123 starts at point of time A while sequence 125 starts at point of time D. Sequence 123 starts by I frame 123(I) and sequence 125 starts by I frame 125(I).

At point in time B intermediate unit 40 receives a request (indicated by flag 130), from second end-user device 61, to view the first program. At point in time B' intermediate unit 40 receives another request (indicated by flag 131), from third end-user device 62, to view the first program.

It is assumed that due to bandwidth constrains intermediate unit 40 can not provide three different unicast media streams (conveying the first programs) to these three end user devices and that the three end user devices shall receive the first multicast program 122.

There can be a time gap (illustrated by the difference between point in time C and D) between a switching point (such as a splicing point) that occurs at point in time C and the next I frame (I frame 125(I) of sequence 125) of the first multicast program 122. Accordingly, during this time gap an intermediate media stream (not shown) is provided to the first end user device.

During another time gap (illustrated by the difference between points in time B and D) the second end user device 61 can receive another intermediate media stream (not shown).

During a further time gap (illustrated by the difference between points in time B' and D) the third end user device 62 can receive another intermediate media stream or an advertisement (not shown).

Figure 7:
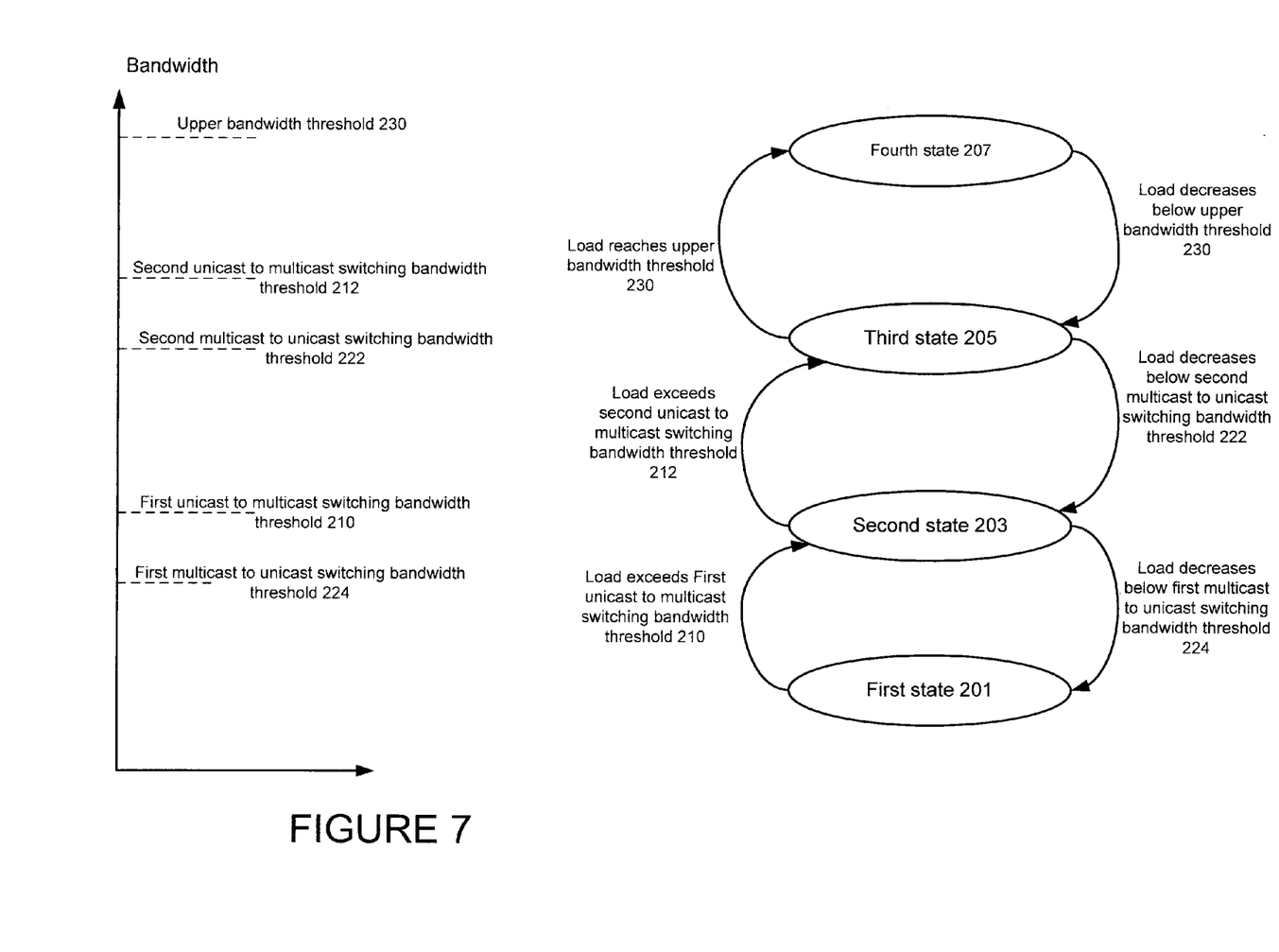
FIG. 7 illustrates a state machine that is responsive to various bandwidth thresholds, according to an embodiment of the invention.

FIG. 7 illustrates a state machine that is responsive to various bandwidth thresholds 210-224, according to an embodiment of the invention.

Conveniently, conversions of media stream types and optionally compressing media streams is responsive to the bandwidth limitation of a communication link between the intermediate unit 40 and an edge unit. The load imposed on this communication link depends upon the requests to view programs by end user devices and upon the type of media stream used to convey the program.

It is noted that although FIG. 7 illustrates five bandwidth switching thresholds that fewer than five or more than five thresholds can be defined. It is also noted that in addition to or instead of one of the illustrated bandwidth switching thresholds, compression thresholds can be applied. It is also noted that at least one unicast to multicast switching bandwidth threshold can equal a multicast to unicast switching bandwidth threshold.

The bandwidth switching thresholds define the behavior of intermediate unit 40 when the load increases or when the load decreases.

The lower threshold is first multicast to unicast switching bandwidth threshold 224. It is followed by first unicast to multicast switching bandwidth threshold 210, by second unicast to multicast switching bandwidth threshold 222, by second unicast to multicast switching bandwidth threshold 212 and by upper bandwidth threshold 230.

It is noted that the upper bandwidth threshold 230 can be defined in response to a maximal amount of bandwidth that can be allocated for video transmission between the intermediate unit 40 and an edge unit connected to that intermediate unit 40.

The state machine belongs to intermediate unit 40 or is implemented by intermediate unit.

At a first state 201 intermediate unit 40 can provide to end users unicast media streams that convey the programs requested by the end users.

The first state 201 is followed by second state 203 once the load rises above first unicast to multicast switching bandwidth threshold 210. During second state 203 some new requests to receive programs will be followed by a provision of multicast media streams.

Second state 203 is followed by third state 205 when the load exceeds second unicast to multicast switching bandwidth threshold 212. During third state 205 new requests to receive programs will be followed by a provision of multicast media streams.

Third state 205 is followed by fourth state 207 if the load reaches upper bandwidth threshold 230. At the fourth state 207 new requests to receive programs can be denied.

The fourth state 207 is followed by third state 205 if the load decreases below upper bandwidth threshold 230. Third state 205 is followed by second state 203 if the load decreases below second multicast to unicast switching bandwidth threshold 222. Second state 203 is followed by first state 201 if the load decreases below first multicast to unicast switching bandwidth threshold 224.

It is noted that compression can be applied in addition to these media stream type conversions.

Conveniently, intermediate unit 40 can initiate a process of pruning media streams, starting at the lowest priority programs. Intermediate unit 40 can calculate, based on control signals indicating how many end user devices are tuned into which programs, how many unicast media streams should be converted to multicast media streams in order to lower the load and even enter another load range.

It is noted that if many media streams should be converted than this can be executed in a gradual manner. Conveniently starting from the lower priority media streams.

Figure 8:
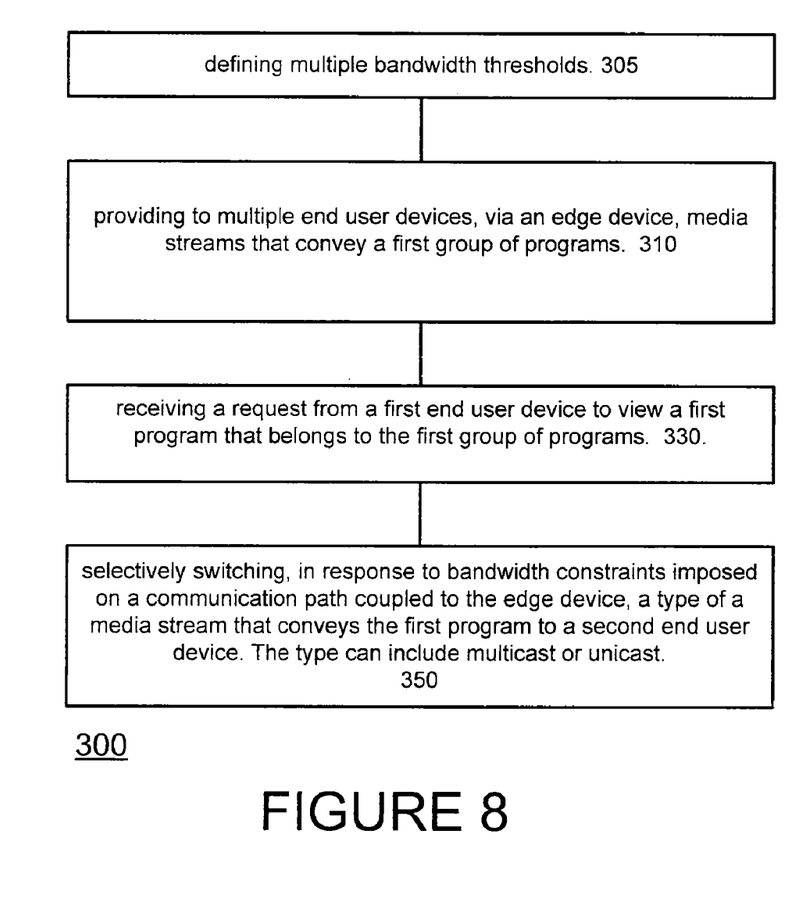
FIG. 8 illustrates a method for providing programs to multiple end users, according to an embodiment of the invention.

FIG. 8 illustrates method 300 for providing programs to multiple end user devices, according to an embodiment of the invention.

Method 300 conveniently starts by stage 305 of defining multiple bandwidth thresholds. Exemplary thresholds are illustrated in FIG. 8.

Stage 305 is followed by stage 310 of providing to multiple end user devices, via an edge device media streams that convey a group of programs. The media streams can be of a first type and alternatively or additionally of a second type. These two types include a unicast media stream and a multicast media stream.

Stage 310 is followed by stage 330 of receiving a request from a first end user device to view a first program that belongs to the group of programs.

Stage 330 is followed by stage 350 of selectively switching, in response to bandwidth constraints imposed on a communication path coupled to the edge device, a type of a media stream that conveys the first program to a second end user device. Accordingly, the switching occurs only in a selective manner—only when the bandwidth constraints require such switching. Thus, an end user that received a unicast media stream that conveys a certain program can start receiving a multicast media stream that conveys the same program, once the load is increased above a certain threshold. Yet for another example, an end user that received a multicast media stream that conveys a certain program can start receiving a unicast media stream that conveys the same program, once the load is decreased below a certain threshold.

The switching between media stream of one type to another can be responsive to various parameters in order to provide seamless or substantially seamless switching.

A time gap can be present between an end of a sequence of pictures of a media stream (of a first type) received by the end user and between a start of a sequence of pictures that belongs to a media stream (of a second type) that the end user is going to receive. Yet another time gap can be presented between a request to receive a program and between a start of a sequence of pictures that belongs to a media stream that the end user is going to receive.

This time gap can be used for providing an advertisement to the end user, to provide an advertisement that is preceded by and/or followed by blank pictures, by providing black images, or by pictures that include instruction that duplicate the preceding picture or the following picture.

During this time gap or at least during a portion of that time gap the end user can see a "frozen" image or a black image (only black pixels). A frozen image can be provided by duplicating an image or sending pictures that include instruction that duplicate the preceding picture or the following picture.

Conveniently, stage 350 includes determining to perform a selective switching between a first unicast media stream that conveys the media stream and a first multicast media stream that conveys the first program.

Conveniently, stage 350 includes sending to the second end-user device, during a time gap between a switching point and a provision of the first multicast media stream, a last independently decodable image of the first multicast media stream that was received prior to the determination.

Referring to the pervious figures, intermediate unit 40 can store the last group of pictures of each program it sends towards an edge device. At point in time D the intermediate unit 40 stores I-frame (123(I)) of sequence 123 and it can provide it during the time gap between points in time C and D or the time gap between B and D.

The timing of the switching can be set according to one or more parameters. Accordingly, stage 350 can include selectively switching at: (i) substantially an advertisement insertion splicing point; (ii) substantially an end of an advertisement; (iii) substantially a reception of a request from the second end user device to change a program.

Conveniently stage 350 includes sending to the second end-user device, during a time gap between a switching point and a provision of the first multicast media stream, an intermediate media stream that comprises a last independently decodable frame of the first multicast media stream that was received prior to the determination and previously decodable frames that follow that last independently decodable frame. The independently decodable frame can be an I-frame.

Referring to the previous figures, intermediate unit 40 can store the last group of pictures of each program it sends towards an edge device. At point in time D the intermediate unit 40 stores I-frame (123(I)) of sequence 123 as well as various P frames and B frames that belong to sequence 123. These frames can be provided during the time gap between points in time C and D or the time gap between B and D.

Conveniently stage 350 includes sending to the second end-user device, during a time gap between a switching point and a provision of the first multicast media stream, an intermediate media stream that is a time shifted version of the first multicast media stream.

Conveniently, method 300 includes a stage of converting non-independently decodable frames of the first multicast media stream to independently decodable frames. This stage may be followed by sending to the second end-user device, during a time gap between a switching point and a provision of the first multicast media stream an intermediate media stream that comprises the independently decodable frames.

Conveniently, stage 350 of selectively switching is responsive to a switching priority associated with programs conveyed by media streams.

Conveniently stage 350 is responsive to a switching priority associated with programs conveyed by media streams.

Conveniently, stage 350 is responsive to a relationship between required bandwidth to the multiple bandwidth thresholds. Conveniently, stage 320 includes defining at least one unicast to multicast switching bandwidth threshold and defining at least one multicast to unicast switching bandwidth threshold; wherein the at least one unicast to multicast switching bandwidth threshold differs from the at least one multicast to unicast switching bandwidth threshold. An exemplary definition is illustrated in FIG. 7.

Conveniently method 300 includes receiving at least one multicast media stream and re-generating the at least one multicast media stream. The re-generating can include altering the address or port associated with the media stream. This can, for example, include altering the address of a media stream that is converted from a unicast media stream to a multicast media stream, altering an address of a media stream that was rate-shaped and the like.

Figure 9:
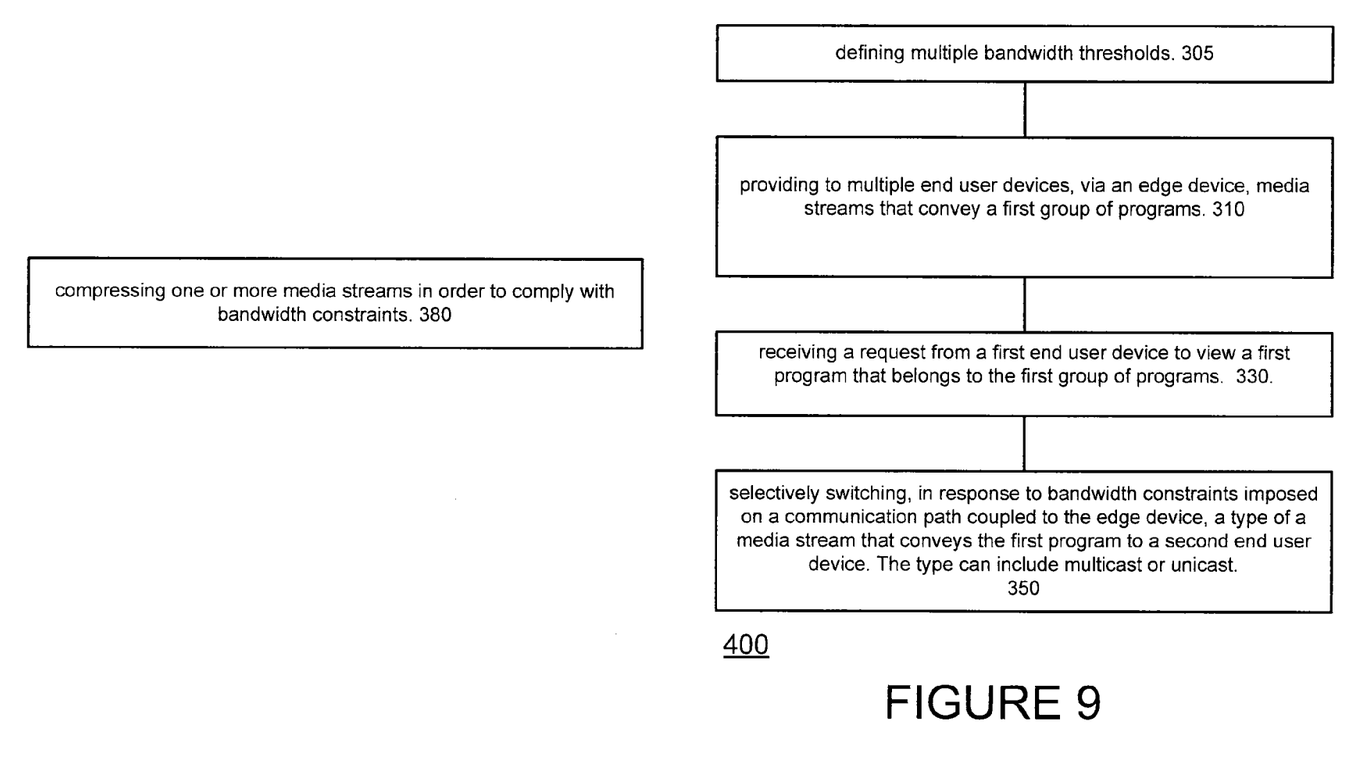
FIG. 9 illustrates a method for providing programs to multiple end users, according to an embodiment of the invention.

FIG. 9 illustrates method 400 for providing programs to multiple end user devices, according to an embodiment of the invention.

Method 400 differs from method 300 by including stage 380 of compressing one or more media streams in order to comply with bandwidth constraints. This stage is usually executed when media stream type conversions are not adequate, but this is not necessarily so.

Stage 380 can be executed even before unicast media streams are converted to multicast media streams in response to the priority of the programs conveyed over the various media streams. For example a high priority program can be conveyed over a unicast media stream while another media stream is compresses if the unicast media stream has a high priority. The priority can be driven from a need to provide certain advertisements to certain end users. It is noted that the priority can be associated with the end users that receive the unicast media streams.

Variations, modifications, and other implementations of what is described herein will occur to those of ordinary skill in the art without departing from the spirit and the scope of the invention.

What is claimed is:

1. A method for providing programs to multiple end user devices, the method comprising:
    defining at least one unicast to multicast switching bandwidth threshold and defining at least one multicast to unicast switching bandwidth threshold;
    providing to multiple end user devices, via an edge device, at least one type of media stream out of a unicast media stream and a multicast media stream; wherein the at least one type of media stream convey a group of programs;
    receiving, by an intermediate device, a request from a first end user device to view a first program that belongs to the group of programs; and
    selectively switching, by the intermediate device, in response to a relation between bandwidth constraints imposed on a communication path coupled to the edge device and the defined switching bandwidth thresholds, a type of a media stream that conveys the first program to a second end user device.

2. The method according to claim 1 wherein the selectively switching occurs at substantially an advertisement insertion splicing point.

3. The method according to claim 1 wherein the selectively switching occurs at substantially a reception of a request from the second end user device to change a program.

4. The method according to claim 1 further comprising sending to the second end user device, during a time gap between a switching point and a provision of the first multicast media stream, a last independently decodable image of the first multicast media stream that was received prior to the switching.

5. The method according to claim 1 further comprising sending to the second end user device, during a time gap between a switching point and a provision of the first multicast media stream, an intermediate media stream that comprises a last independently decodable frame of the first multicast media stream that was received prior to the determination and previously decodable frames that follow that last independently decodable frame.

6. The method according to claim 1 further comprising sending to the second end user device, during a time gap between a switching point and a provision of the first multicast media stream, an intermediate media stream that is a time shifted version of the first multicast media stream.

7. The method according to claim 1 further comprising converting non independently decodable frames of the first multicast media stream to independently decodable frames and sending to the second end-user device, during a time gap between a switching point and a provision of the first multicast media stream an intermediate media stream that comprises the independently decodable frames.

8. The method according to claim 1 wherein the selectively switching is responsive to a switching priority associated with programs conveyed by media streams.

9. The method according to claim 1 further comprising compressing at least one media stream in response to the bandwidth constraints imposed on the communication path coupled to the edge device.

10. The method according to claim 1 further comprising defining multiple bandwidth thresholds and wherein the selectively switching is responsive to a relationship between required bandwidth to the multiple bandwidth thresholds.

11. The method according to claim 1, wherein the at least one unicast to multicast switching bandwidth threshold differs from the at least one multicast to unicast switching bandwidth threshold.

12. The method according to claim 1 further comprising receiving at least one multicast media stream and re-generating the at least one multicast media stream.

13. A device for providing multiple programs, the device comprises an output interface configured to:
(i) define at least one unicast to multicast switching bandwidth threshold and define at least one multicast to unicast switching bandwidth threshold;
(ii) provide to an edge device at least one type of media stream out of a unicast media stream and a multicast media stream; wherein the at least one type of media stream convey a group of programs; and wherein the media streams are provided via the edge device to multiple end users;
(iii) receive a request from a first end user device to view a first program that belongs to the group of programs; and
a controller adapted to determine when to selectively switch, in response to a relation between bandwidth constraints imposed on a communication path coupled to the edge device and the defined switching bandwidth thresholds, a type of a media stream that conveys the first program to a second end user device.

14. The device according to claim 13 further configured to perform the selective switching at substantially an advertisement insertion splicing point.

15. The device according to claim 13 further configured to perform the selective switching at substantially a reception of a request from the second end user device to change a program.

16. The device according to claim 13 further configured to send to the second end-user device, during a time gap between a switching point and a provision of the first multicast media stream, a last independently decodable image of the first multicast media stream that was received prior to the switching.

17. The device according to claim 13 further configured to send to the second end-user device, during a time gap between a switching point and a provision of the first multicast media stream, an intermediate media stream that comprises a last independently decodable frame of the first multicast media stream that was received prior to the determination and previously decodable frames that follow that last independently decodable frame.

18. The device according to claim 13 further configured to send to the second end-user device, during a time gap between a switching point and a provision of the first multicast media stream, an intermediate media stream that is a time shifted version of the first multicast media stream.

19. The device according to claim 13 further configured to convert non-independently decodable frames of the first multicast media stream to independently decodable frames and to send to the second end-user device, during a time gap between a switching point and a provision of the first multicast media stream an intermediate media stream that comprises the independently decodable frames.

20. The device according to claim 13 further configured to selectively switch in response to selectively switch in response to a switching priority associated with programs conveyed by media streams.

21. The device according to claim 13 further configured to compress at least one media stream in response to the bandwidth constraints imposed on the communication path coupled to the edge device.

22. The device according to claim 13 further configured to define multiple bandwidth thresholds and wherein the selective switching is responsive to a relationship between required bandwidth to the multiple bandwidth thresholds.

23. The device according to claim 13 wherein the definition comprises defining at least one unicast to multicast switching bandwidth threshold that differs from the at least one multicast to unicast switching bandwidth threshold.

24. The device according to claim 13 further configured to receive at least one multicast media stream and to re-generate the at least one multicast media stream.

* * * * *